(12) United States Patent
Scheelke et al.

(10) Patent No.: US 9,398,244 B2
(45) Date of Patent: Jul. 19, 2016

(54) ADAPTABLE PROGRAMMING GUIDE FOR NETWORKED DEVICES

(75) Inventors: Eric Scheelke, Cupertino, CA (US); Theodore L. Griggs, Woodside, CA (US)

(73) Assignee: RESOURCE CONSORTIUM LIMITED (VG)

( * ) Notice: Subject to any disclaimer, the term of this patent is extended or adjusted under 35 U.S.C. 154(b) by 603 days.

(21) Appl. No.: 13/008,598

(22) Filed: Jan. 18, 2011

(65) Prior Publication Data

US 2011/0113448 A1 May 12, 2011

Related U.S. Application Data (63) Continuation of application No. 11/490,648, filed on Jul. 21, 2006, now abandoned, which is a continuation-in-part of application No. 10/846,096, filed on May 14, 2004, now abandoned, which is a continuation-in-part of application No. 10/000,495, filed on Oct. 30, 2001, now abandoned, and a continuation-in-part of application No. 09/909,676, filed on Jul. 19, 2001, now abandoned.

(60) Provisional application No. 60/470,748, filed on May 14, 2003, provisional application No. 60/244,790, filed on Oct. 31, 2000, provisional application No. 60/233,581, filed on Sep. 19, 2000, provisional application No. 60/219,857, filed on Jul. 20, 2000.

(51) Int. Cl.
*H04N 5/445* (2011.01)
*H04N 5/44* (2011.01)
(Continued)

(52) U.S. Cl.
CPC ......... *H04N 5/44543* (2013.01); *H04N 5/4401* (2013.01); *H04N 7/17318* (2013.01); *H04N 21/25891* (2013.01); *H04N 21/26283* (2013.01); *H04N 21/4131* (2013.01); *H04N 21/4135* (2013.01); *H04N 21/4532* (2013.01); *H04N 21/4622* (2013.01); *H04N 21/472* (2013.01); *H04N 21/4753* (2013.01); *H04N 21/4755* (2013.01); *H04N 21/482* (2013.01); *H04N 21/4821* (2013.01); *H04N 21/4828* (2013.01)

(58) Field of Classification Search
CPC ................................................ H04N 21/23109
USPC ....................................................... 725/39, 47
See application file for complete search history.

(56) References Cited

U.S. PATENT DOCUMENTS 3,341,833 A   9/1967 Jones
3,440,427 A   4/1969 Kammer
(Continued)

FOREIGN PATENT DOCUMENTS

EP   0 041 121   12/1981
EP   0 254 924   2/1988
(Continued)

*Primary Examiner* — Michael Hong
(74) *Attorney, Agent, or Firm* — The Belles Group, P.C.

(57) ABSTRACT

An electronic content guide is disclosed. The electronic content guide preferably includes a source field for listing content sources and output devices. The electronic content guide also includes a first content field for listing schedule data corresponding to first content data presently available for viewing from each one of the content sources and for listing display information corresponding to the first content data being displayed for viewing at a present time by each one of the output devices. Preferably, the source field and the first content field are displayable in parallel columns. The electronic content guide can also include a second content field, displayable in a column parallel to the source field and the first content field, corresponding to a second content data. In one embodiment, the first content data from each content source can be displayed simultaneously on more than one of the output devices.

20 Claims, 5 Drawing Sheets

(51) Int. Cl.

| | |
|---|---|
| *H04N 7/173* | (2011.01) |
| *H04N 21/258* | (2011.01) |
| *H04N 21/262* | (2011.01) |
| *H04N 21/41* | (2011.01) |
| *H04N 21/45* | (2011.01) |
| *H04N 21/462* | (2011.01) |
| *H04N 21/472* | (2011.01) |
| *H04N 21/475* | (2011.01) |
| *H04N 21/482* | (2011.01) |

(56) References Cited

U.S. PATENT DOCUMENTS

| | | |
|---|---|---|
| 3,493,674 A | 2/1970 | Houghton |
| 3,645,539 A | 2/1972 | Jenkins |
| 3,682,363 A | 8/1972 | Hull |
| 3,833,757 A | 9/1974 | Kirk, Jr. et al. |
| 3,855,426 A | 12/1974 | Bouwhuis |
| 3,891,792 A | 6/1975 | Kimura |
| 3,996,583 A | 12/1976 | Hutt et al. |
| 4,016,361 A | 4/1977 | Pandey |
| 4,026,555 A | 5/1977 | Kirschner et al. |
| 4,052,719 A | 10/1977 | Hutt et al. |
| 4,096,524 A | 6/1978 | Scott et al. |
| 4,134,127 A | 1/1979 | Campioni et al. |
| 4,139,860 A | 2/1979 | Micic et al. |
| 4,161,728 A | 7/1979 | Insam et al. |
| 4,170,782 A | 10/1979 | Miller |
| 4,203,130 A | 5/1980 | Doumit et al. |
| 4,205,343 A | 5/1980 | Barrett et al. |
| 4,218,698 A | 8/1980 | Bart et al. |
| 4,222,069 A | 9/1980 | Groetschel et al. |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,270,145 A | 5/1981 | Farina et al. |
| 4,283,735 A | 8/1981 | Jagger |
| 4,288,809 A | 9/1981 | Yabe et al. |
| 4,319,286 A | 3/1982 | Hanpachera |
| 4,325,080 A | 4/1982 | Satoh et al. |
| 4,329,684 A | 5/1982 | Monteath et al. |
| 4,337,480 A | 6/1982 | Bourassin et al. |
| 4,337,483 A | 6/1982 | Guillou et al. |
| 4,344,090 A | 8/1982 | Belisomi et al. |
| 4,390,901 A | 6/1983 | Keiser et al. |
| 4,408,309 A | 10/1983 | Kiesling et al. |
| 4,412,244 A | 10/1983 | Shanley, II |
| 4,412,281 A | 10/1983 | Works |
| 4,420,769 A | 12/1983 | Novak |
| 4,425,581 A | 1/1984 | Schweppe et al. |
| 4,430,676 A | 2/1984 | Johnson |
| 4,445,195 A | 4/1984 | Yamamoto et al. |
| 4,449,249 A | 5/1984 | Price |
| 4,456,925 A | 6/1984 | Skelos et al. |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,521,914 A | 6/1985 | Petrovic et al. |
| 4,547,804 A | 10/1985 | Greenberg |
| 4,566,034 A | 1/1986 | Harger et al. |
| 4,577,240 A | 3/1986 | Hedberg et al. |
| 4,595,951 A | 6/1986 | Filliman |
| 4,595,952 A | 6/1986 | Filliman |
| 4,620,229 A | 10/1986 | Amano et al. |
| 4,630,108 A | 12/1986 | Gomersall |
| 4,631,601 A | 12/1986 | Brugliera et al. |
| 4,633,331 A | 12/1986 | McGrady et al. |
| 4,691,351 A | 9/1987 | Hayashi et al. |
| 4,694,490 A | 9/1987 | Harvey et al. |
| 4,706,121 A | 11/1987 | Young |
| 4,707,121 A | 11/1987 | Sawaki et al. |
| 4,734,765 A | 3/1988 | Okada et al. |
| 4,751,578 A | 6/1988 | Reiter et al. |
| 4,768,228 A | 8/1988 | Clupper et al. |
| 4,786,982 A | 11/1988 | Wakahara et al. |
| 4,841,132 A | 6/1989 | Kajitani et al. |
| 4,866,434 A | 9/1989 | Keenan |
| 4,876,670 A | 10/1989 | Nakabayashi et al. |
| 4,891,715 A | 1/1990 | Levy et al. |
| 4,908,707 A | 3/1990 | Kinghorn et al. |
| 4,908,713 A | 3/1990 | Levine |
| 4,949,187 A | 8/1990 | Cohen |
| 4,963,866 A | 10/1990 | Duncan |
| 4,963,994 A | 10/1990 | Levine |
| 4,972,396 A | 11/1990 | Rafner |
| 4,977,455 A | 12/1990 | Young |
| 4,991,033 A | 2/1991 | Takeshita et al. |
| 5,016,273 A | 5/1991 | Hoff |
| 5,021,893 A | 6/1991 | Scheffler |
| 5,038,211 A | 8/1991 | Hallenbeck |
| 5,063,453 A | 11/1991 | Yoshimura et al. |
| 5,119,075 A | 6/1992 | Smith |
| 5,134,499 A | 7/1992 | Sata et al. |
| 5,184,115 A | 2/1993 | Black et al. |
| 5,193,208 A | 3/1993 | Yokota et al. |
| 5,223,924 A | 6/1993 | Strubbe |
| 5,227,934 A | 7/1993 | Vasilescu et al. |
| 5,241,428 A | 8/1993 | Goldwasser et al. |
| 5,291,554 A | 3/1994 | Morales |
| 5,293,357 A | 3/1994 | Hallenbeck |
| 5,307,173 A | 4/1994 | Yuen et al. |
| 5,321,514 A | 6/1994 | Martinex |
| 5,329,320 A | 7/1994 | Yifrach et al. |
| 5,345,430 A | 9/1994 | Moe |
| 5,357,383 A | 10/1994 | Godwin |
| 5,371,551 A | 12/1994 | Logan et al. |
| 5,371,795 A | 12/1994 | Vogel et al. |
| 5,382,983 A | 1/1995 | Kwoh et al. |
| 5,404,505 A | 4/1995 | Levinson |
| 5,438,423 A | 8/1995 | Lynch et al. |
| 5,452,291 A | 9/1995 | Eisenhandler et al. |
| 5,457,583 A | 10/1995 | Kaneko et al. |
| 5,475,835 A | 12/1995 | Hickey |
| 5,479,268 A | 12/1995 | Young et al. |
| 5,485,219 A | 1/1996 | Woo et al. |
| 5,489,894 A | 2/1996 | Murray |
| 5,508,815 A | 4/1996 | Levine |
| 5,515,173 A | 5/1996 | Mankovitz et al. |
| 5,534,911 A | 7/1996 | Levitan |
| 5,555,463 A | 9/1996 | Staron et al. |
| 5,557,422 A | 9/1996 | Nishigaki et al. |
| 5,585,838 A | 12/1996 | Lawler et al. |
| 5,589,892 A | 12/1996 | Knee et al. |
| 5,619,274 A | 4/1997 | Roop et al. |
| 5,663,757 A | 9/1997 | Morales |
| 5,666,645 A | 9/1997 | Thomas et al. |
| 5,682,206 A | 10/1997 | Wehmeyer et al. |
| 5,701,383 A | 12/1997 | Russo et al. |
| 5,703,795 A | 12/1997 | Mankovitz |
| 5,729,549 A | 3/1998 | Kostreski et al. |
| 5,751,883 A | 5/1998 | Ottesen et al. |
| 5,758,257 A | 5/1998 | Herz et al. |
| 5,781,246 A | 7/1998 | Alten et al. |
| 5,798,785 A | 8/1998 | Hendricks et al. |
| 5,818,441 A | 10/1998 | Throckmorton et al. |
| 5,870,150 A | 2/1999 | Yuen |
| 5,987,213 A | 11/1999 | Mankovitz et al. |
| 5,988,078 A | 11/1999 | Levine |
| 6,029,045 A | 2/2000 | Picco et al. |
| 6,029,195 A | 2/2000 | Herz |
| 6,037,933 A | 3/2000 | Blonstein et al. |
| 6,100,884 A | 8/2000 | Tomita et al. |
| 6,177,931 B1 | 1/2001 | Alexander et al. |
| 6,219,839 B1 | 4/2001 | Sampsell |
| 6,255,961 B1 | 7/2001 | Van Ryzin et al. |
| 6,263,503 B1 | 7/2001 | Margulis |
| 6,305,018 B1 | 10/2001 | Usui et al. |
| 6,323,911 B1 | 11/2001 | Schein et al. |
| 6,374,406 B2 | 4/2002 | Hirata |
| 6,388,714 B1 | 5/2002 | Schein et al. |

(56) References Cited

U.S. PATENT DOCUMENTS

| | | |
|---|---|---|
| 6,434,747 B1 | 8/2002 | Khoo et al. |
| 6,452,923 B1 | 9/2002 | Gerszberg et al. |
| 6,466,971 B1 | 10/2002 | Humpleman et al. |
| 6,469,753 B1 | 10/2002 | Klosterman et al. |
| 6,490,443 B1 | 12/2002 | Freeny, Jr. |
| 6,505,348 B1 | 1/2003 | Knowles et al. |
| 6,510,152 B1 | 1/2003 | Gerszberg et al. |
| 6,594,688 B2 | 7/2003 | Ludwig et al. |
| 6,611,654 B1 | 8/2003 | Shteyn |
| 6,637,029 B1 | 10/2003 | Eilat et al. |
| 6,678,740 B1 | 1/2004 | Rakib et al. |
| 6,678,891 B1 | 1/2004 | Wilcox et al. |
| 6,684,399 B1 | 1/2004 | Grooters |
| 6,694,352 B1 | 2/2004 | Omoigui |
| 6,704,028 B2 | 3/2004 | Wugofski |
| 6,721,955 B2 | 4/2004 | Khoo et al. |
| 6,747,591 B1 | 6/2004 | Lilleness et al. |
| 6,756,997 B1 | 6/2004 | Ward, III et al. |
| 6,766,526 B1 | 7/2004 | Ellis |
| 6,774,926 B1 | 8/2004 | Ellis et al. |
| 6,804,705 B2 | 10/2004 | Greco et al. |
| 6,865,746 B1 | 3/2005 | Herrington et al. |
| 6,868,292 B2 | 3/2005 | Ficco et al. |
| 6,898,762 B2 | 5/2005 | Ellis et al. |
| 6,990,677 B1 | 1/2006 | Pietraszak et al. |
| 7,076,734 B2 | 7/2006 | Wolff et al. |
| 7,143,429 B2 | 11/2006 | Mineyama |
| 7,197,713 B2 | 3/2007 | Stern |
| 7,975,277 B1* | 7/2011 | Jerding et al. .................. 725/25 |
| 2001/0005903 A1* | 6/2001 | Goldschmidt Iki et al. .... 725/50 |
| 2002/0046407 A1 | 4/2002 | Franco |
| 2002/0053081 A1 | 5/2002 | Griggs |
| 2002/0120932 A1 | 8/2002 | Schwalb |
| 2002/0124253 A1 | 9/2002 | Eyer et al. |
| 2002/0154157 A1 | 10/2002 | Sherr et al. |
| 2003/0028887 A1 | 2/2003 | Frouin et al. |
| 2004/0019908 A1 | 1/2004 | Williams et al. |
| 2004/0068739 A1 | 4/2004 | Russ et al. |
| 2004/0255327 A1 | 12/2004 | Scheelke |
| 2005/0018648 A1 | 1/2005 | Scheelke |
| 2005/0022241 A1 | 1/2005 | Griggs |
| 2005/0022243 A1 | 1/2005 | Scheelke |
| 2005/0076361 A1 | 4/2005 | Choi et al. |
| 2005/0086687 A1 | 4/2005 | Omoigui |
| 2005/0160461 A1 | 7/2005 | Baumgartner et al. |
| 2005/0289618 A1* | 12/2005 | Hardin ............................ 725/95 |
| 2006/0150214 A1* | 7/2006 | Ramraz et al. .................. 725/44 |
| 2006/0259926 A1 | 11/2006 | Griggs |
| 2006/0277580 A1 | 12/2006 | Scheelke |
| 2007/0101370 A1 | 5/2007 | Calderwood |
| 2007/0199030 A1 | 8/2007 | Ellis et al. |
| 2007/0283393 A1 | 12/2007 | Kikinis |
| 2008/0077960 A1 | 3/2008 | Griggs |
| 2008/0101455 A1 | 5/2008 | Scheelke |
| 2008/0155618 A1 | 6/2008 | Grady et al. |
| 2009/0044226 A1 | 2/2009 | Ellis et al. |

FOREIGN PATENT DOCUMENTS

| | | |
|---|---|---|
| EP | 0 254 927 | 2/1988 |
| EP | 0 368 313 | 6/1997 |
| EP | 0 924 927 | 6/1999 |
| EP | 1 187 348 | 3/2002 |
| JP | 9-322147 | 12/1997 |
| JP | 2000-115646 | 4/2000 |
| WO | WO-91/07050 | 5/1991 |
| WO | WO-92/08320 | 5/1992 |
| WO | WO-98/26584 | 6/1998 |
| WO | WO-99/35849 | 7/1999 |
| WO | WO-00/08855 | 2/2000 |
| WO | WO-00/11869 | 3/2000 |
| WO | WO-00/30350 | 5/2000 |
| WO | WO 00/36584 | 6/2000 |
| WO | WO 00/52928 | 9/2000 |

* cited by examiner

Fig. 1
(PRIOR ART)

UNIVERSAL CONTENT GUIDE

Show C, Ch. 5, KPIX-CBS, Comedy, TV-Y***, 60 minutes

Description of Show H. Description of Show H. Description of Show H. Description of Show H. Description of Show H.

Starring: Person A, Person B, Person C, Person D.

| Source | 1:00PM | Content | | Additional information | |
|---|---|---|---|---|---|
| Ch. 2 KTVU - FOX | 1:00PM-1:30PM | Show A | Quick Description | 1:30PM-2:00PM | *Next* - Show B Quick Description |
| Ch. 4 KRON - NBC | 1:00PM-2:00PM | Show C | Quick Description | 2:00PM-3:00PM | *Next* - Show D Quick Description |
| Ch. 5 KPIX - CBS | 12:30PM-4:30PM | Show E *(In-progress)* | Quick Description | 4:30PM-5:00PM | *Next* - Show F Quick Description |
| Internet Atom Films | On Demand | Short Film G | Quick Description | Download Time: 106:23 *(Estimated)* Price: Free | |
| Home Device DVD Player | Status Disk Ready | Film H | Quick Description | Living Room DVD Quick Description | |
| First Home Device TV | Status On | Show A | Quick Description | Living Room TV Quick Description | |
| Second Home Device TV | Status On | Following Living Room TV | Quick Description | Bed Room TV Quick Description | |

Fig. 2

| Source | Content | Additional Info |
|---|---|---|
| HBO ™ on demand | Movie A on demand | Description running time |
| HBO ™ on demand | Movie B on demand | Description running time |
| HBO ™ on demand | Movie C on demand | Description running time |
| ,, | ,, | ,, |
| ,, | ,, | ,, |
| ,, | ,, | ,, |
| ,, | ,, | ,, |
| ,, | ,, | ,, |

ADAPTABLE PROGRAMMING GUIDE FOR NETWORKED DEVICES

CROSS-REFERENCE TO RELATED APPLICATIONS

This application is a continuation of U.S. patent application Ser. No. 11/490,648, filed Jul. 21, 2006, entitled Adaptable Programming Guide for Networked Devices, now abandoned which is a continuation-in-part of U.S. patent application Ser. No. 10/846,096, filed May 14, 2004, entitled Adaptable Programming Guide for Networked Devices now abondoned; U.S. patent application Ser. No. 10/846,096 claims the benefit of U.S. Provisional Patent Application No. 60/470,748, filed May 14, 2003, entitled Adaptable Programming Guide for Networked Devices, and is a continuation-in-part of U.S. patent application Ser. No. 10/000,495, filed Oct. 30, 2001, entitled Adaptable Programming Guide for Networked Devices now abandoned; U.S. patent application Ser. No. 10/000,495 claims the benefit of U.S. Provisional Patent Application No. 60/244,790, filed Oct. 31, 2000, entitled Adaptable Programming Guide for Networked Devices, and is a continuation-in-part of U.S. patent application Ser. No. 09/909,676, filed Jul. 19, 2001, entitled Mechanism for Distributing Content Data now abandoned; U.S. patent application Ser. No. 09/909,676 claims the benefit of U.S. Provisional Patent Application No. 60/233,581, filed Sep. 19, 2000, entitled Mechanism for A Customized Multimedia Content Guide Based on User Preference, and U.S. Provisional Patent Application No. 60/219,857, filed Jul. 20, 2000, entitled Mechanism for Digital Video Rental, Distribution and Catching. All of the foregoing applications are hereby incorporated into the present application by reference.

FIELD OF THE INVENTION

The present invention relates to systems for and methods of distributing content data. More specifically, this invention relates to an apparatus and method of formatting an on-screen programming guide that is adaptable to both a variety of content sources and output devices.

BACKGROUND OF THE INVENTION

Conventional media services provide scheduled programs on viewing devices, such as a television set. Standard broadcast services provide channels that can be received by virtually any television tuner through an antenna connector. At the same time, cable services typically offer packages of preselected channels to the consumers and that required a decoder at the television tuner or on the cable line at an external location. Cable services continuously broadcast scheduled programming through a pre-selected set of channels which are received through a cable connector on a television set. There are also a number of pay-per-view services that allow consumers to receive premium program transmissions through the cable network. Other available services include satellite programming services that provide a service similar to that provided by cable services. Some cable or satellite services allow consumers to select on demand pay-per view- programs from a set of available programs.

With the number of available TV channels increasing, the viewer has a wide range of programs from which to choose. Search and selection of desired programming for a consumer can be time consuming. Channel surfing is no longer fast enough to allow getting an overview of all channels. Daily newspapers and other paper publications have long provided channel listings, often using a grid format that shows what programs are on what channel at what time. However, the amount of TV programs typically exceed the limits of what can reasonably be printed. Further, a newspaper or other publication is not always available to the viewer when the viewer decides to watch television. Attempting to meet this problem of information overload and changing requirements, set-top boxes and televisions with integrated electronic program guides ("EPGs") have emerged.

Electronic program guides are on-screen guides or programming schedules that provide program listings for channels that are broadcast or provided by a cable system. Prior art electronic program guides offer online searching through program listings and schedules by genre, title or data. When a television viewer uses such a schedule, the viewer can find a program of interest, identify the channel, and enter the number into a remote control device.

Figure 1:
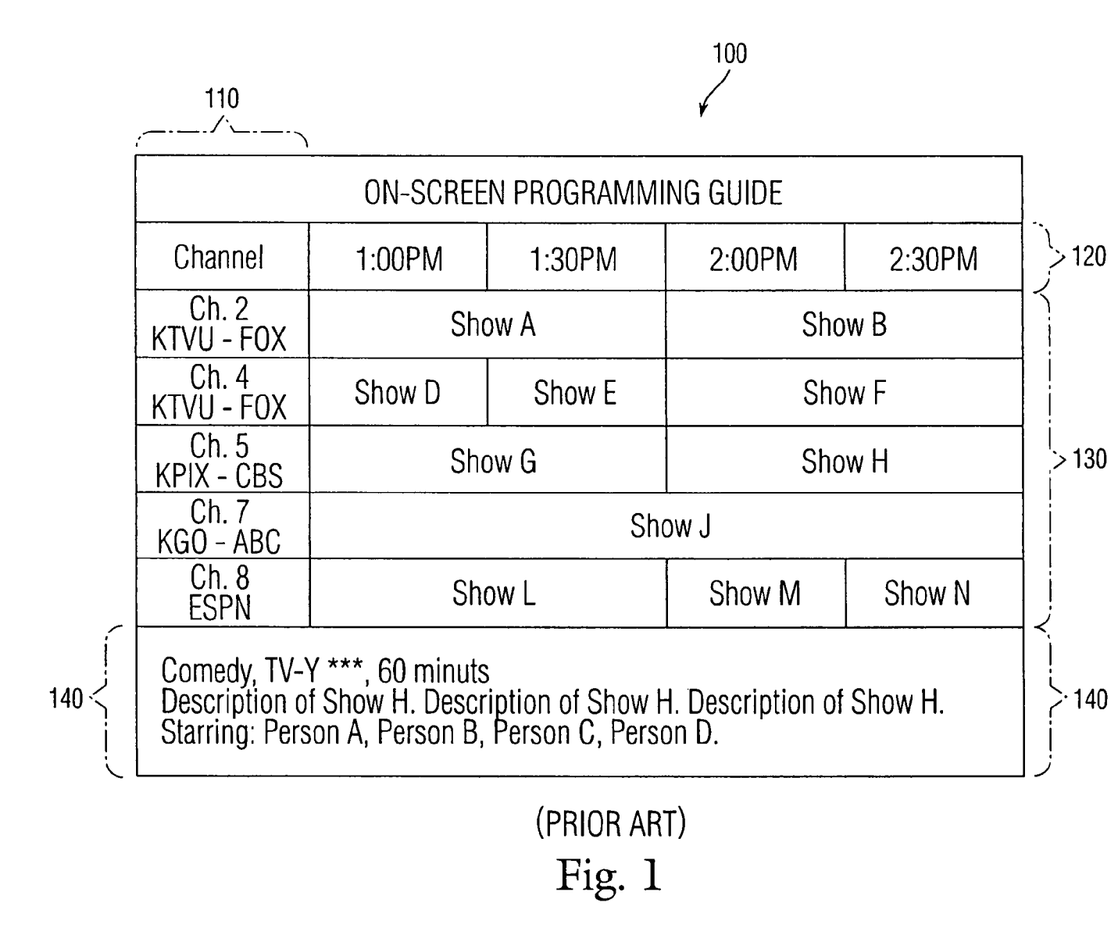
FIG. 1 shows a prior art on-screen programming guide for listing content providers and corresponding program availabilities.

One such prior art electronic program guide is shown in FIG. 1. The prior art guide 100 includes a list of channels 110, a time schedule 120, a grid display 130 of programs, and a description section 140 for conveying additional text information about the programs. The programs are displayed consecutively for each channel in the form of a grid. The prior art guide 100, however, is deficient for many reasons. The prior art guide 100 typically includes content from only a single content provider (i.e. a broadcast television network having a predetermined schedule). Thus, the prior art guide 100 does not provide the viewer with the capability of, or comprehensive information about, purchasing or receiving pay-per-view events, on demand programming, streaming media content off the Internet, accessing content from two or more providers at the same guide, or accessing content from consumer electronic devices such as DVD players and VCRs. The prior art guide 100 also has a static time range and can only display shows within that time range. As shown in FIG. 1, the time schedule 120 displays two hours of schedule information. In the case of a two-hour movie, the viewer is not provided with any information as to what program will appear immediately following the two-hour movie. The viewer is also left with the burden of navigating through the guide by scrolling back and forth. In addition, the prior art guide 100 does not provide display information showing where, for example, a selected program is being played. For example, in a modem home entertainment system where the viewer can play a DVD located in the family room on a television located in a bedroom, the prior art guide 100 does not have the capability of visually displaying what content is being displayed by what output device.

What is needed is an electronic programming guide that is adaptable to various sources of content such as scheduled-based broadcast content, digitally stream-able on-demand multimedia content, and controllable consumer electronic devices. What is also needed is a programming guide that includes both the sources of content available to a user as well as any output device or devices for displaying the content sources.

SUMMARY OF THE INVENTION

The present invention provides an electronic programming guide that is adaptable to various sources of content such as scheduled-based broadcast content, digitally stream-able on-demand multimedia content, and controllable consumer electronic devices. In accordance with a preferred embodiment, the programming guide of the present invention can include both the sources of content available to a user as well as any output device or devices for displaying the content sources.

The present invention further provides a system and method for implementing the electronic programming guide.

In accordance with one embodiment of the present invention, an electronic content guide is disclosed. The electronic content guide comprises a source field for listing content sources and output devices; and a first content field for listing schedule data corresponding to first content data presently available for viewing from each one of the content sources and for listing display information corresponding to the first content data being displayed for viewing at a present time by each one of the output devices.

Preferably, the source field and the first content field are displayable in parallel columns. The content sources can include at least one of: scheduled broadcast content; non-scheduled broadcast content; and consumer source devices. The scheduled broadcast content can include, for example: a network station, a cable channel, a satellite-based channel, and a pay-per-view channel, or a scheduled digital network broadcast (such as a scheduled interne broadcast). The non-scheduled content can include, for example: on-demand programming, streaming media content, and downloadable media files. The consumer source devices can include at least one of: a DVD player, a television tuner, a VCR, a PVR, an MP3 player, a digital video recorder, a PDA, a gaming system, a cellular telephone, and a computer.

Preferably, the electronic content guide includes content data from at least two distinct content providers. However, the content data of the different content providers is not presented separately, but effectively merged in a single table in the schedule. Therefore, the difference between the various content providers is not readily apparent to the user.

Preferably, the first content data corresponding to the scheduled broadcast content comprise a program title and a corresponding program time. Preferably, the first content data corresponding to the non-scheduled content comprise a program title and an indication of availability (such as, for example, an indication that content is available on demand). Preferably, the first content data corresponding to the consumer source device comprise a program title and a status identifier. Preferably, the first content data corresponding to the output devices comprise a program title and a status identifier. Alternatively, the first content data corresponding to the output devices comprise the location of a different output device which is being "followed" by the present output device. The output devices can include at least one of: a stereo speaker, a computer monitor, a computer speaker, a display device, a network media player, a gaming system, and/or a storage device.

The electronic content guide can further include a second content field, displayable in a column parallel to the source field and the first content field, corresponding to a second content data. Preferably, the second content data corresponding to the scheduled broadcast content can comprise a program title that is immediately available for viewing from the content sources after completion of the presently available first content data, wherein the program title includes a corresponding program time. Preferably, the second content data corresponding to the non-scheduled content comprises a download time and a download or viewing fee, progress of download, download speed, and/or messages relating to download (such as network outage messages). The second content data corresponding to non-scheduled content may periodically switch its display between two or more of the above listed indications. Preferably, the second content data corresponding to the consumer source devices comprise a physical location of the consumer source devices. Preferably, the second content data corresponding to the output devices comprise a physical location of the output devices where the first content data are being displayed. The electronic content guide can further include a descriptor field for displaying a detailed description of each content source, each output device, the first content data, and the second content data.

In accordance with another embodiment of the present invention, an electronic content guide is disclosed. The electronic content guide includes a source field for listing content sources and output devices. The electronic content guide also includes a first content field for listing schedule data corresponding to first content data presently available for viewing from the content sources and for listing display information corresponding to the first content data being displayed for viewing at a present time by the output devices. The electronic content guide further includes a second content field for listing schedule data corresponding to second content data that are immediately available for viewing from the content sources after completion of the presently available first content data and for listing locations of the output devices where the first content data are being displayed. Preferably, the source field, the first content field and the second content field are displayable in parallel columns. The electronic content guide can also include a descriptor field for displaying a detailed description of each content source, each output device, the first content data, and the second content data.

In accordance with another embodiment of the present invention, an electronic content guide is disclosed. The electronic content guide includes a source field for listing content sources and output devices; and a first content field for listing schedule data corresponding to first content data presently available for viewing from the content sources and for listing display information corresponding to the first content data being displayed for viewing at a present time by each one of the output devices; wherein the first content data from each content source can be displayed simultaneously on more than one of the output devices. The electronic content guide can also include a second content field, displayable in a column parallel to the source field and the first content field, corresponding to a second content data. The electronic content guide can also include a descriptor field for displaying a detailed description of each content source, each output device, the first content data, and the second content data.

A consumer source device, or a non-scheduled content source may be a multiple item content source. A multiple item content source may be presented in the schedule as multiple content sources, or as a single content source, wherein additional menus are used to select a particular item.

The present electronic programming guide may also offer a search function which would allow a user to search for a particular item of content.

Because of the presence of multiple content sources, multiple instances of the same content item may be available at the same time from different sources. The present invention may rank these multiple versions according to applicable factors. The rankings may be used to choose the display order of the multiple versions, or whether some versions are displayed at all.

DETAILED DESCRIPTION OF A PREFERRED EMBODIMENT

Figure 2:
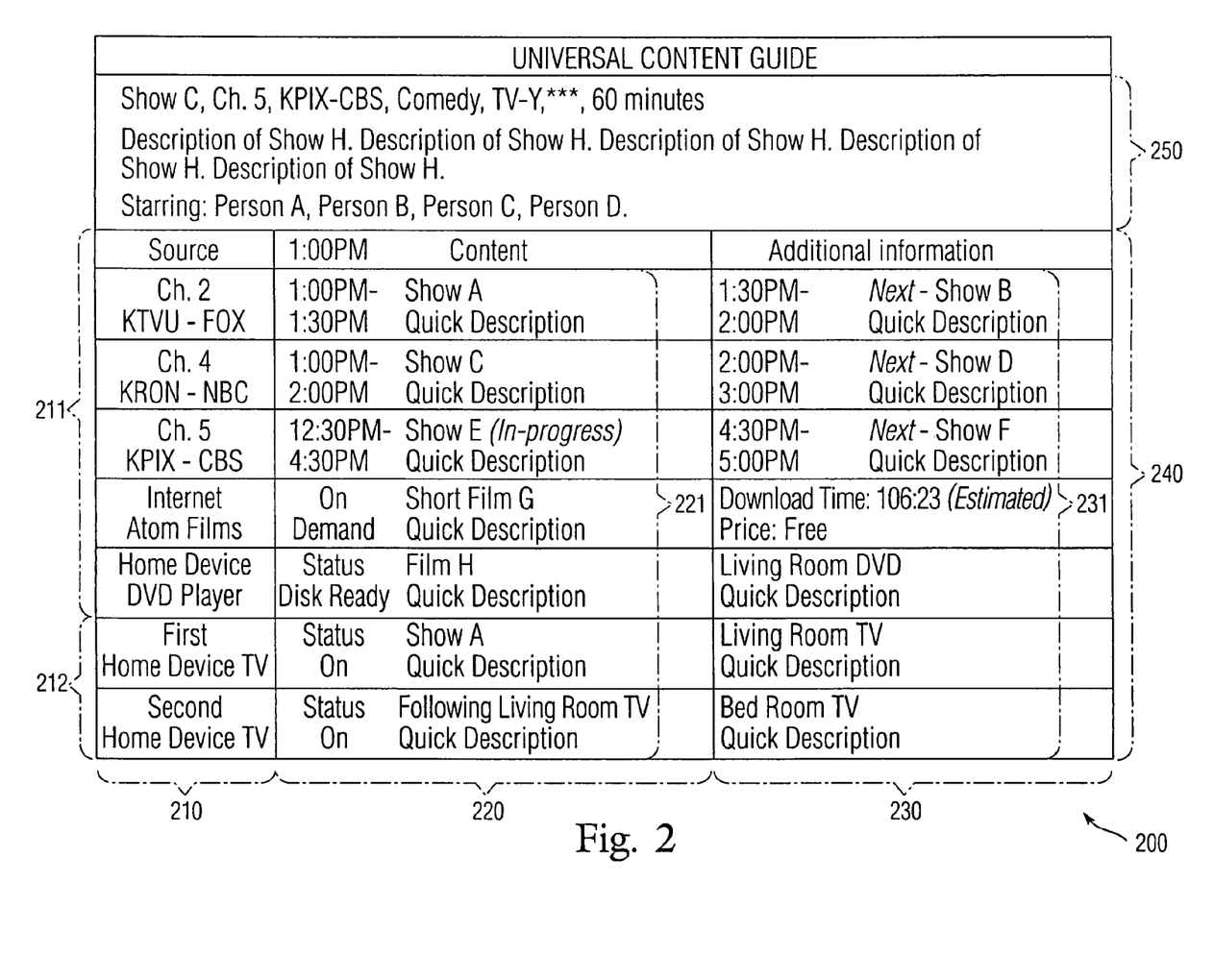
FIG. 2 shows an on-screen programming guide adaptable for listing multiple content source providers, including source listings, content listings and availabilities, and output devices for displaying the media content, in accordance with the present invention.

FIG. 2 shows an on-screen programming guide adaptable for listing multiple content source providers, including source listings, content listings and availabilities, and output devices for displaying the media content, in accordance with one embodiment of the present invention.

A content source provider is an entity that provides content to the user. Thus, a content source provider may be a cable service, a satellite dish service, a broadcast TV tower emitting a plurality of TV channels available over the air, or a digital network. A content source is a single source of content, such as a Television channel, or a website or server available over the digital network. A content source provider usually provides multiple content sources.

Digital devices, such as DVD, VCR, players, attachable hard-drives, MP3 players, systems, etc. may be considered both content source providers and content sources. In other words, a DVD player is a content source provider that includes a single content source—the DVD player itself.

The guide 200 comprises multiple entries, with each entry representing one of plurality of rows. The entries describe a number of content sources 211 and output devices 212 within a source field 210. The guide 200 also includes a first content field 220 for listing schedule data corresponding to first content data 221 presently available for viewing from the content sources 211 and for listing display information corresponding to the first content data 221 being displayed for viewing at a present time by the output devices 212. The guide 200 can further include a second content field 230 for listing schedule data corresponding to second content data 231 that are immediately available for viewing from the content sources 211 after completion of the presently available first content data 221 and for listing locations of the output devices 212 where the first content data 221 are being displayed. The second content field 230 can also include download and pricing information, if applicable, for the content sources 221. The second content field can even include source location information, if applicable, for the content sources 221. Preferably, the source field 210, the first content field 220 and the second content field 230 are all displayable in parallel columns with each other using a grid format 240. The guide 200 can also include a descriptor field 250 for displaying a detailed description of each content source 211, each output device 212, the first content data 221 and the second content data 231.

The content sources 211 within the source field 210 can comprise scheduled broadcast content, non-scheduled content, and consumer source devices. The scheduled broadcast content can include at least one of: a network station, a cable channel, a satellite-based channel, and a pay-per-view channel. The non-scheduled content can include at least one of: on-demand programming, streaming media content, and downloadable multimedia files. The consumer source devices can include at least one of: a DVD player, a VCR, a PVR, an MP3 Player, a digital video recorder, a television tuner a PDA, a cellular telephone, a gaming system, and a computer. For example, the content sources 211 within the source field 210 comprise the network stations Ch. 2 KTVU-FOX, Ch. 4 KRON-NBC, Ch. 5 KPIX-CBS; the downloadable file from the Internet (Atom Films); and the consumer source device Home Device DVD player. Other content sources can also be included within the source field 210.

The output devices 212 within the source field 210 can include at least one of: a television, a stereo speaker, a computer monitor, a computer speaker, a display device, a network media player, a gaming system, and a storage device. For example, the output devices 212 within the source field 210 comprise two Home Device Televisions. In one embodiment, the televisions display content from any one of the content sources 211.

In accordance with one embodiment of the present invention, the first content data 221 corresponding to the scheduled broadcast content comprise a program title and a corresponding program time. For example, within the first content field 220 an entry for Show A is listed as being available from Ch. 2 KTVU-FOX. The Show A has a start time of 1:00 PM and a finish time of 1:30 PM. Also, within the first content field 220 an entry for Show C is listed as being available from Ch. 4 KRON-NBC. The Show C has a start time of 1:00 PM and a finish time of 2:00 PM. Further, within the first content field 220 an entry for Show E is listed as being available from Ch. 5 KPIX-CBS. The Show E has a start time of 12:30 PM and a finish time of 4:30 PM.

In accordance with one embodiment of the present invention, the first content data 221 corresponding to the non-scheduled content comprise a program title and an indication of availability. For example, within the first content field 220 an entry for Short Film G is listed as being available from the Internet. The Short Film G's indication of availability is "on demand", thus it has no program start time.

In accordance with one embodiment of the present invention, the first content data 221 corresponding to the consumer source devices comprise a program title and a status identifier. For example, within the first content field 220 an entry for Film H is listed as being available from the Home Device DVD Player. In this example, the Film H is recorded on a DVD. As mentioned above, the consumer source device listed on the guide 200 can be any consumer source device, such as a VCR, PVR an MP3 player, television tuner, a digital video recorder, a PDA, a cellular telephone or computer that displays its content on an output device such as a television.

In accordance with one embodiment of the present invention, the first content data 221 corresponding to the output devices comprise a program title and a status identifier. For example, within the first content field 220 an entry for Show A is listed as being sent to and displayed by a first Home Device television. The entry for Show A also lists the first television as being "on" next to "Status". Thus, the guide 200 lists Show A as being displayed on the first television, which is "on". Also, within the first content field 220 an entry for Living Room TV is listed as being available from a second Home Device television. However, as will be explained more fully below in connection with the second content field 230, the Living Room TV is actually the first television and the second television is a Bedroom TV. In this example, as the guide 200 shows, the Living Room TV is watching the Show A, and the Bedroom TV is watching what the Living Room TV is watching; in other words, the Bedroom TV is following the Living Room TV. Thus, Show A is being displayed on both the first television (Living Room TV) and the second television (Bedroom TV).

In accordance with another embodiment of the present invention and as mentioned above, the second content field 230, which is displayable in a column parallel to the source field 210 and the first content field 220, corresponds to the second content data 231. In one embodiment, the second content data 231 corresponding to the scheduled broadcast content comprise a program title that is immediately available for viewing from the content sources 211 after completion of the presently available first content data 221. The program title of the scheduled broadcast content includes a corresponding program time. For example, within second content field 230 a Show B is listed as being available from the Ch. 2 KTVU-FOX immediately following completion of the Show A. The Show B has a start time of 1:30 PM and a finish time of 2:00 PM. Also, within the second content field 230 a Show D is listed as being available from the Ch. 4 KRON-NBC immediately following completion of the Show C. The Show D has a start time of 2:00 PM and a finish time of 3:00 PM. Further, within the second content field 230 a Show F is listed as being available from the Ch. 5 KPIX-CBS immediately following completion of the Show E. The Show F has a start time of 4:30 PM and a finish time of 5:00 PM. Unlike the grid format of the prior art guide 100 which has a static time range and can only display programs within that time range, the guide 200 of the present invention shows what program is next available following the completion of the presently available program no matter what time the next program comes on. In the FIG. 2, this is shown on the rows whose sources are Ch. 2 KTVU-FOX, Ch. 4 KRON-NBC, and Ch. 5 KPIX-CBS.

In one embodiment of the present invention, the second content data 231 corresponding to the non-scheduled content comprise a download time and a download or viewing fee, if applicable. For example, the Short Film G listed in the first content field 220 has a download time of 1:06:23 (estimated) and no download or viewing fee, which are listed in the second content field 230. In addition, the second content data of Short Film G may include download progress, download speed, and/or messages relating to download (such as network outage messages). The second content data may change periodically between two or more of the above listed indications.

In one embodiment of the present invention, the second content data 231 corresponding to the consumer source devices comprise a physical location of the consumer source devices. For example, the Home Device DVD Player listed under the source field 210 is physically located in the Living Room under the second content field 230. Thus, a viewer using the guide 200 can realize that the Home Device DVD Player, which has loaded the DVD Film H, is actually the DVD Player located in the living room.

In one embodiment of the present invention, the second content data corresponding to the output devices comprise a physical location of the output devices where the first content data are being displayed. For example, within the second content field 230, an entry for Living Room TV and Bedroom TV are listed on the rows whose sources are First Home Device TV and Second Home Device TV, respectively. The First Home Device TV is actually the television located in the living room. Similarly, the Second Home Device TV is actually the television located in the bedroom. As shown on the guide 200, the Living Room TV is presently playing Show A while the Bedroom TV is playing what the Living Room TV is playing, i.e. the Show A.

In another embodiment of the present invention, content referred to by the first content data from each content source 211 can be displayed simultaneously on more than one of the output devices 212. This novel feature of the present invention allows, for example, two viewers, one located in the living room the other in the bedroom, to simultaneously view the same on-demand program listed in the first content field 220. This feature is especially useful in home entertainment systems with multiple source devices and output devices all interconnected with one another.

In another embodiment of the present invention and still referring to FIG. 2, the guide 200 can include a descriptor field 250 for displaying a detailed description of each content source 211, each output device 212, the first content data 221, and the second content data 231. The descriptor field preferably comprises an area for listing more detailed information about each selected item. For example, the descriptor field 250 can include a detailed description of a television program selected and/or status information of an output device.

Preferably, the electronic content guide includes content data from at least two distinct content source providers. Therefore, the content guide may include content data from two different cable services, or a cable service and a satellite service. Thus, for example, the 'Ch. 2 KTVU-FOX' content source may be provided by a cable service, while the 'Ch. 5 KPIX-CBS' content source may be provided by a satellite service. However, the content sources of the different content source providers are not visually or functionally segregated at the schedule. In other words, the present invention preferably combines the content sources 211 into a single universal schedule (or Universal Content Guide) and not into several distinct schedules each associated with a respective content provider.

Thus, the Universal Content Guide as shown in FIG. 2 creates an overall impression that the content sources are in fact all a part of a single content source provider. The universal guide may provide some indication of which content source provider each content source belongs to. For example, the Universal Content Guide may show a sign or an icon which indicates if 'Ch. 5 KPIX-CBS' (for example) is provided by a traditional broadcast, cable or satellite service. However, since the content is not necessarily organized by content source provider, specific knowledge of the various content source providers is not required for a user to be able to browse the Universal Content Guide or utilize the search functionality.

A non-scheduled content source may be a multiple item content source. In other words, it may simultaneously offer multiple items of content. Examples of such sources include an Internet server, which offers multiple items of content, or an on-demand service which includes multiple TV-shows, or movies, etc. A consumer source device may also be a multiple item content source. An example may be a multiple disk DVD player, a high capacity storage device, with multiple items of content loaded thereon, or a PVR with multiple items of content loaded thereon.

Figure 3:
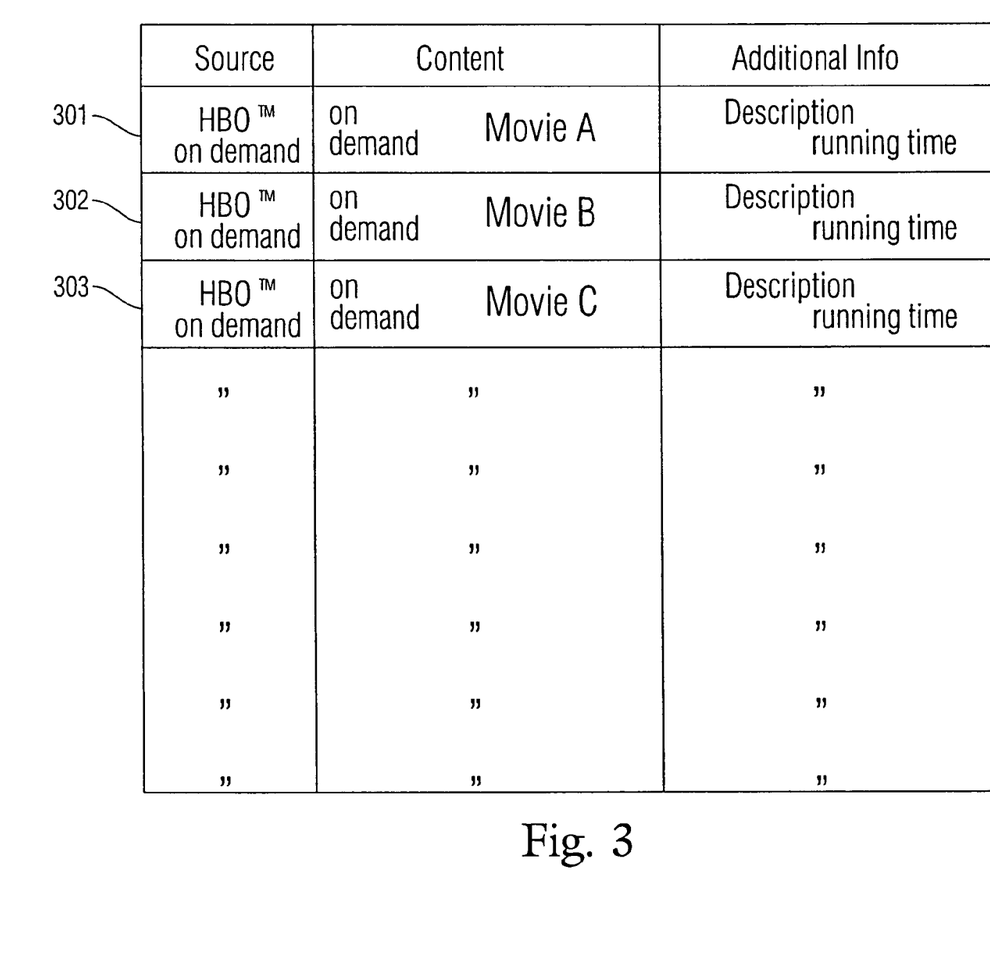
FIG. 3 shows a first embodiment for the representation of a multiple item content source.

FIG. 3 shows a multiple item content source according to another embodiment of the present invention. As shown in FIG. 3, the multiple item content source may be presented in the schedule as multiple content sources, each content source corresponding to a single item of the multiple item content source. For example, a single multiple item content source— HBO on demand™—offers a plurality of items, such as movies A, B and C. The movies are represented as different records 301, 302, and 303, respectively and thus they appear as different content sources.

Figure 4:
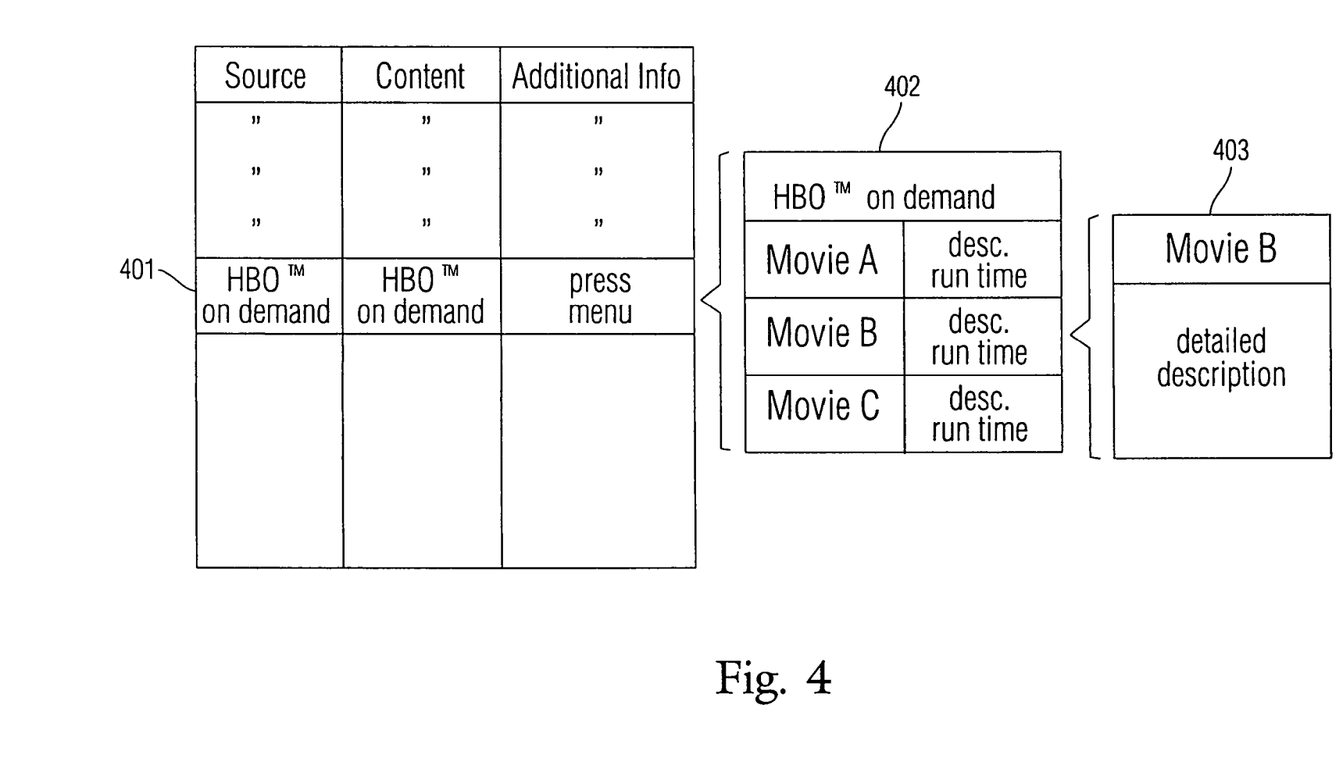
FIG. 4 shows a second embodiment for the representation of a multiple item content source.

FIG. 4 shows a multiple item content source in accordance with yet another embodiment of the present invention. According to this embodiment, the multiple item content source may be represented as a single content source. In this case, additional menus allow choosing a specific item from the content source. Thus, upon selecting record 401, a user will be presented with an additional menu 402 that shows the multiple items of the multiple item content source. Upon selecting an item from the additional menu, the user may be presented with yet another menu 403 showing detailed information about a particular item as well as allowing the user to view that item.

The present electronic programming guide may also offer a search function which would allow a user to search for a particular content. The search may be based on the name of a particular piece of content, the name of the source of the content, or a description of the content, or other metadata. The search function may encompass each item of a multiple item content source, regardless of which embodiment is used to display these items. Thus, if the second embodiment is used and the specific items of a multiple item content source are thus 'hidden' from the top level schedule, the search function may be used to access these items even if the name of the content source is not known.

Due to the possible presence of multiple content source providers, multiple instances of the same content item may be available at the same time from different sources. For example, if the content sources include both a cable and a satellite TV input, two instances of the same channel may be offered by the satellite and cable systems respectively. Alternatively, the same movie or other program may be offered by two different channels, or by a channel, and a DVD placed within a DVD drive, or by a channel and an internet content provider, etc. If that is the case, the present invention may rank the multiple instances of the same content according to predefined criteria. The highest ranked instance may be listed at a relatively high place in the schedule. The other instances may be listed at the end of the schedule, or they may not be listed at all. This would remove clutter and make the schedule easier to navigate.

An indication may be shown at the representation of the highest ranked instance to alert the user that additional instances are available. The user may be shown a menu of the additional instances if he/she selects the indication.

A content guide in accordance of the present invention may rank the instances according to various different criteria. For example, in accordance with one embodiment, technical criteria may be used to rank the listing. Technical criteria may include the suitability of a particular version of content to be displayed on an output device (such as a TV set) the user is viewing. Thus, the pixel or color resolution, the media encoding format, the aspect ratio may indicate different levels of compatibility between the various versions of the content and the output device. Thus the version of the content which is most compatible with the output device would be ranked highest.

It should be noted that various incompatibilities between certain version of content and an output device may be resolved by reprocessing the content. For example, aspect ratio incompatibilities may be resolved by adding 'black bands', the content may be converted to a compatible format and resolutions may be upgraded and downgraded. Nevertheless, it is preferable that when multiple versions of content are available the version which is the most compatible with the output device is selected. This is the case because resolving the various compatibilities often degrades the quality of content. For example, content which is upgraded to a higher resolution usually is of worse quality than content which was originally sampled (e.g., filmed) at the higher resolution.

In addition to technical criteria, preference criteria may be used. Preference criteria refer not to technical compatibilities but to the preferences of the user. Preference criteria may include, whether viewing the content requires additional payment, whether viewing the content requires waiting for a download, the language in which the content is presented, the availability of subtitles or closed captioning, whether the content is presented in its original version or whether it has been cut or altered, whether the content may be paused while viewing, and whether viewing a particular version of the content would engage a device which could be otherwise useful for other purposes.

The user may select which criteria are to be used and how much weight each criteria is to be given. Computer devices implementing embodiments of the present invention compute the ranking of the various versions of a particular piece of content according to the thus selected criteria.

In an alternative embodiment, the present invention may not reorder content sources in the schedule according to their ranking. Instead it may automatically switch the source of a particular content item the user has selected with a higher ranked version of that same content item available from another content source. Thus, for example, if a user selects a sports game from the NBC channel, and the same sports game is available in high definition at the NBC (HD) channel, and the user has a High Definition Television set compatible with the NBC (HD) channel, the present invention may automatically switch the user's Television to the NBC (HD) channel.

In yet another alternative embodiment, the present invention may not rank repeating content sources at all. Instead it may treat all content sources that include the same content at a certain time as being essentially identical. In this embodiment, multiple content sources that provide the same content at the same time are shown as single generic content source. If the user selects the generic content source, the underlying system may select which one of the multiple content sources to display based on algorithms designed to optimize internal system resources, such as the tuning capacity, or the network bandwidth of the system. In an alternative embodiment, the present system may rank repeating sources but it may also include an optimization factor in the rankings, the optimization factor indicating how much benefit a particular source would have on the overall efficiency of use of system resources, such tuners, bandwidth, etc.

Figure 5:
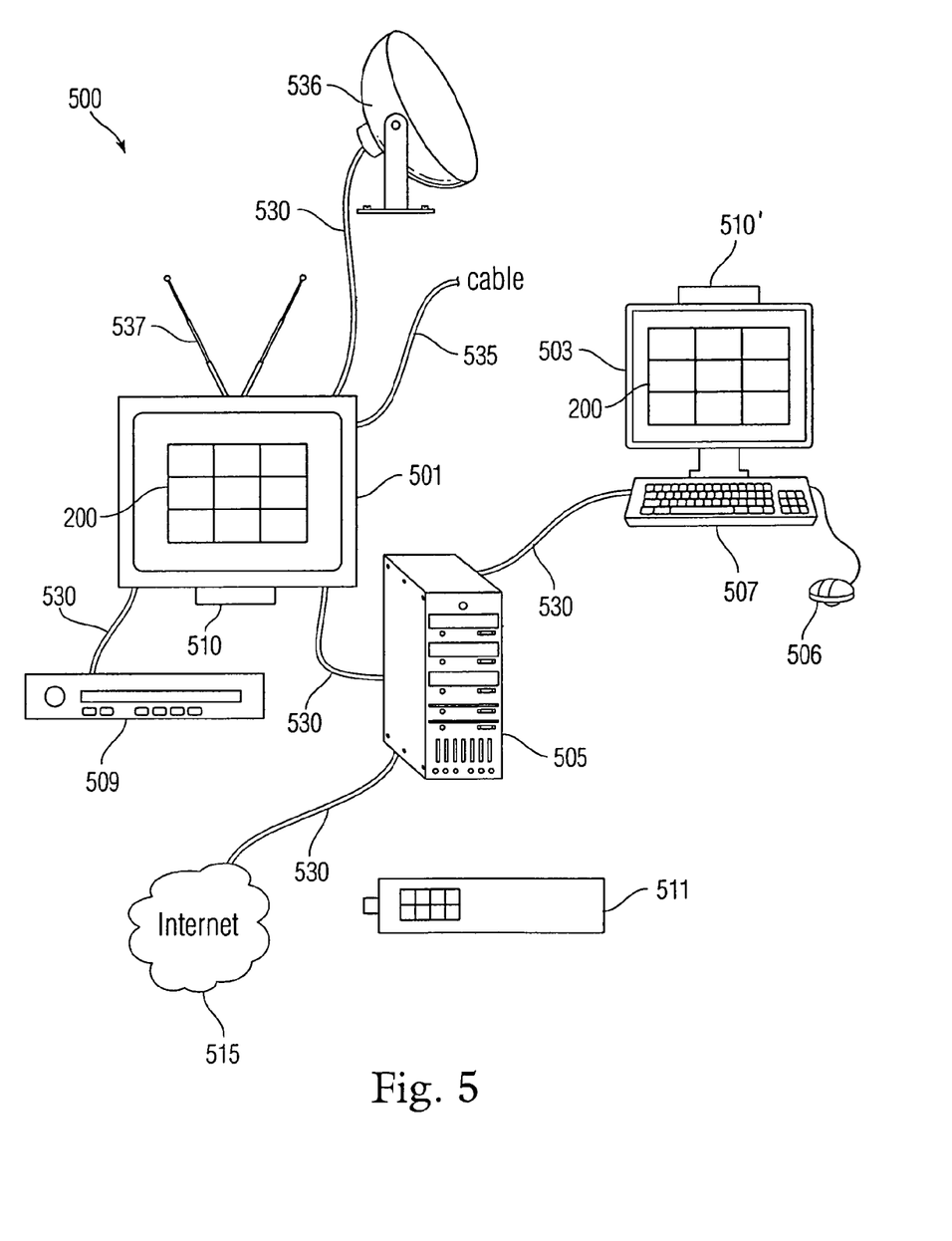
FIG. 5 is a schematic diagram of a system for implementing embodiments of the present invention.

FIG. 5 is a diagram of an example system for implementing the various embodiments of the present invention. The schedule utilized in the instant invention is preferably an electronic program schedule 200 that is displayable on an electronic device, such as a television screen 501 or computer screen 503. The schedule 200 may be supported through a computer 505 which hosts the hardware and software to support and display the program schedule 200 on the screens 501 and/or 503. A user is preferably capable of selecting a program from the program availabilities listed on the schedule 200 with a suitable control device including a mouse 506, a key board, 507 and/or an infrared remote control 511. The monitors can be equipped with infrared sensors 510 and/or 510' that are responsive to commands from the infrared remote control 511. Alternatively, the computer 505 may be equipped with an interface for the remote control. Furthermore, the computer may be equipped with infrared transmitters with which it may control the television 501.

Still referring to FIG. 5, a local area network 530 preferably couples the computer 505 with media playing appliances, such as a VCR player and/or a DVD player 509 as well as other content source providers, such as cable service 535, satellite service 536, or ordinary broadcast signal receiver 537. These content source providers may also be connected to the TV set through ordinary means (e.g. various coaxial and audio visual cables). The computer 505 is also preferably coupled to the internet 515 through a suitable connection, such that selected on-demand programs are capable of being transmitted to the computer 505 from a remote server via the internet. The television 501 can also be coupled to program providers through a cable network 535 to receive scheduled programs listed on the program schedule 200.

In a preferred method of the instant invention the electronic program schedule 200 is generated from a list of user preferences. User preferences can include, but are not limited to selected content source providers, user likes, user dislikes, criteria for selection of content when multiple versions are available and/or user availabilities. A distribution network provides a link between a user location and a remote server which stores the user preferences and the electronic program schedule in a user account. The user can access his/her account through the network to view the schedule and/or modify the account to generate an updated program schedule. In another embodiment of the instant invention, the program schedule is automatically updated. For example, the system and network can be configured to automatically update the program schedule based on the user's habits, such automatically added programs selected from previous version of the user's schedule.

The computer 505 can be a central hub for content data distribution. The computer 505 monitors content data availabilities from the content source providers and organizes the program availabilities into customized program schedules. The computer preferably includes a memory and a generally programmable central processing unit (CPU). The memory includes instructions which when executed by the CPU realize the functionality discussed above. The computer may be an embedded device.

The present invention can be supported with any number of network architectures, hardware and software. Therefore, the present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention.

What is claimed:

1. A method of creating an electronic program guide for a user of an entertainment system, the method comprising:
   automatically establishing, by a user computer in communication with the entertainment system, display criteria comprising technical criteria corresponding to the display capabilities of a user display device operably coupled to the entertainment system;
   receiving, by the user computer, a plurality of content listings, wherein each content listing comprises a content title, an indication of a content source, and at least one presentation characteristic for presentation of the content title by the content source;
   grouping, by the user computer, the plurality of content listings based on content title;
   ranking, by the user computer, each content listing in each grouping based on a comparison of the technical criteria and the presentation characteristics of each content listing in the grouping; and
   creating, by the user computer, a content entry in the electronic program guide corresponding to the highest ranked content listing in each grouping.

2. The method of claim 1, further comprising:
   causing the electronic program guide to be displayed on the user display device.

3. The method of claim 1, further comprising:
   creating an additional content entry in the electronic program guide for each of the received plurality of content listings that is not the highest ranked content listing in the grouping.

4. The method of claim 1, wherein the technical criteria are selected from a group consisting of pixel resolution, color resolution, media encoding format, and aspect ratio.

5. The method of claim 1, wherein the ranking each content listing further comprises:
   ranking the content listings in each grouping based on a degree of compatibility between the technical criteria and the presentation characteristics of each respective content listing; and
   selecting a highest ranked content listing from each grouping as a preferred content listing for that grouping.

6. The method of claim 1, wherein the display criteria further comprise preference criteria corresponding to one or more user preferences.

7. The method of claim 1, wherein the selecting the preferred content listing is further based on a measure of system resources available to the entertainment system.

8. The method of claim 3, wherein the content entries corresponding to the highest ranked content listings are placed before the additional entries in the electronic program guide.

9. The method of claim 3, further comprising:
   receiving a user selection of a content entry in the electronic program guide that does not correspond to a highest ranked content listing; and
   presenting content corresponding to the highest ranked content listing on the user display device in response to receiving the user selection.

10. The method of claim 6, wherein the preference criteria are selected from a group consisting of payment requirements, download requirements, language, availability of subtitles or closed captioning, alteration of content from its original version, and ability to pause content while viewing.

11. The method of claim 10, wherein each of the display criteria is weighted based on user input.

12. The method of claim 7, wherein the system resources comprise one or more of tuning capacity and available network bandwidth.

13. A method of creating an electronic program guide for a user of an entertainment system, the method comprising:
   automatically establishing, by a user computer in communication with the entertainment system, technical criteria corresponding to the display capabilities of a user display device operably coupled to the user computer;
   receiving, by the user computer, a plurality of content listings, each content listing comprising a content title and at least one presentation characteristic for presentation of the content title by a content source;
   grouping, by the user computer, the plurality of content listings based on content title;
   determining, by the user computer, a ranked order for each grouping of content listings, wherein the ranked order is based on a comparison of the technical criteria and the presentation characteristics of each content listing in the grouping; and
   causing, by the user computer, an electronic program guide comprising a plurality of entries corresponding to the plurality of content listings to be presented on the user display device.

14. The method of claim 13, further comprising:
   receiving a user selection of an entry in the electronic program guide;

selecting, in response to the user selection, a highest ranked content listing from a grouping of content listings corresponding to the selected entry; and automatically presenting content associated with the highest ranked content listing on the user display device.

15. The method of claim 14, wherein the ranked order is further based on one or more user preferences.

16. The method of claim 15, further comprising:

updating the user preferences based on the user selection of the entry in the electronic program guide.

17. A system for creating an electronic program guide for a user of an entertainment system, the method comprising:

a receiver module configured to receive a plurality of content listings, wherein each content listing comprises a content title and at least one presentation characteristic for presentation of the content title by a content source;

a processor configured to automatically establish display criteria comprising technical criteria corresponding to the display capabilities of a user display device operably coupled to the entertainment system, to group the plurality of content listings based on content title, and to rank each content listing in each grouping based on a comparison of the technical criteria and the presentation characteristics of each content listing in the grouping; and a display interface configured to creating a content entry in the electronic program guide corresponding to the highest ranked content listing in the grouping.

18. The system of claim 17, wherein the display interface is further configured to create an additional content entry in the electronic program guide for each of the received plurality of content listings that is not the highest ranked content listing in the grouping.

19. The method of claim 17, wherein the display criteria further comprises preference criteria corresponding to one or more user preferences.

20. The method of claim 18, wherein the receiver module is further configured to receive a user selection of a content entry in the electronic program guide that does not correspond to a preferred content listing; and the display interface is further configured to present content corresponding to the highest ranked content listing on the user display device in response to receiving the user selection.

* * * * *